(12) United States Patent
Wada et al.

(10) Patent No.: US 6,229,687 B1
(45) Date of Patent: May 8, 2001

(54) SOLID ELECTROLYTIC CAPACITOR

(75) Inventors: Tomohide Wada, Kyoto; Kenji Kuranuki, Muko, both of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/318,833

(22) Filed: May 26, 1999

(30) Foreign Application Priority Data

May 27, 1998 (JP) .................................................. 10-145341

(51) Int. Cl.$^7$ ...................................................... H01G 9/00
(52) U.S. Cl. ............................................. 361/523; 361/534
(58) Field of Search ......................................... 361/523, 533, 361/534, 535–538, 540, 813, 301.3, 303, 306.1

(56) References Cited

U.S. PATENT DOCUMENTS 5,198,967 * 3/1993 Kuranuki et al. ..................... 361/523

FOREIGN PATENT DOCUMENTS 4-253314   9/1992 (JP) .

* cited by examiner

*Primary Examiner*—Anthony Dinkins
(74) *Attorney, Agent, or Firm*—Parkhurst & Wendel, L.L.P

(57) ABSTRACT

A solid electrolytic capacitor of the present invention is produced by connecting a solid electrolytic capacitor element with a lead frame after plating the lead frame with copper and then roughening the surface thereof, and then by molding the solid electrolytic capacitor element and lead frame with an encapsulating resin possessing a thermal expansion coefficient that is near the thermal expansion coefficient of the lead frame. The solid electrolytic capacitor thus produced shows excellent solderability and can withstand a thermal shock encountered at the time of soldering when the solid electrolytic capacitor is mounted on a circuit board. Accordingly, a solid electrolytic capacitor that ensures excellent reliability after being mounted on a circuit board is obtained. In addition, by coating the terminals of the solid electrolytic capacitor with protective plating after resin molding, the solid electrolytic capacitor realizes long shelf life and also assures excellent reliability after being mounted on a circuit board.

4 Claims, 5 Drawing Sheets

PRIOR ART

SOLID ELECTROLYTIC CAPACITOR

FIELD OF THE INVENTION

The present invention relates to a solid electrolytic capacitor used in a variety of electronic equipment and particularly characterized by exhibiting excellent characteristics when used in surface mounted circuits.

BACKGROUND OF THE INVENTION

In recent years, as the advancement of electronic equipment has been made, more electronic components are used in a chip form and it has become the industry trend to build electronic circuits by employing surface mount technology.

To cope with this trend, not only excellent solderability is required of the terminals of chip components but also high heat resistance to withstand the temperatures of two hundreds and several tens of degrees for a protracted period has been required of the chip components themselves.

In the area of electrolytic capacitors that have been inherently vulnerable in terms of heat resistance, chip type products for a surface mounting application have become available as the advancement in materials and technologies has been made recently. An example of such surface mountable electrolytic capacitors is a solid electrolytic capacitor as shown in FIG. 8, which is formed by molding an interior capacitor element together with lead frames 21 and 22, which also serve as terminals, with an encapsulating resin 23.

However, the foregoing conventional solid electrolytic capacitor has a problem of degradation of the interior capacitor element caused by infiltration of oxygen and moisture into the inside of the resin from outside that takes place at the time of surface mounting of the chip capacitor. The cause of the above infiltration can be further attributed to the following two points:

(1) The tin or solder layer on the surface of the lead frame melts due to the heat applied at the time of surface mounting of the chip capacitor and thereby a gap is created between the encapsulating resin and the lead frame.

(2) Due to the differential in thermal expansion coefficient between the metal forming the lead frame (usually iron) and the encapsulating resin, a gap is formed between the encapsulating resin and the lead frame.

The object of the present invention is to solve the foregoing problem involved with the conventional solid electrolytic capacitor, thereby making it possible to supply a solid electrolytic capacitor exhibiting high reliability even when a thermal shock is imposed to the electrolytic capacitor at the time of surface mounting.

SUMMARY OF THE INVENTION

A solid electrolytic capacitor of the present invention comprises:
  a solid electrolytic capacitor element, which is prepared by forming an oxide layer, a conductive high polymer layer and a conductor layer in succession on a valve metal,
  lead frames electrically connected to above valve metal and above conductor layer of the capacitor element and
  a protective resin which encapsulates the capacitor element and a part of the lead frames, wherein at least the surface of the lead frames that come into contact with said protective resin has a copper layer, and the protective resin has a thermal expansion coefficient that is close to the thermal expansion coefficient of a metal constituting the lead frame.

Further, the foregoing copper layer of the solid electrolytic capacitor of the present invention has the surface roughness of 0.9 micrometers or more in Ra value.

DESCRIPTION OF PREFERRED EMBODIMENTS

Next, a description will be made on some of the exemplary embodiments of the present invention with reference to the drawings.

First Exemplary Embodiment

Figure 1:
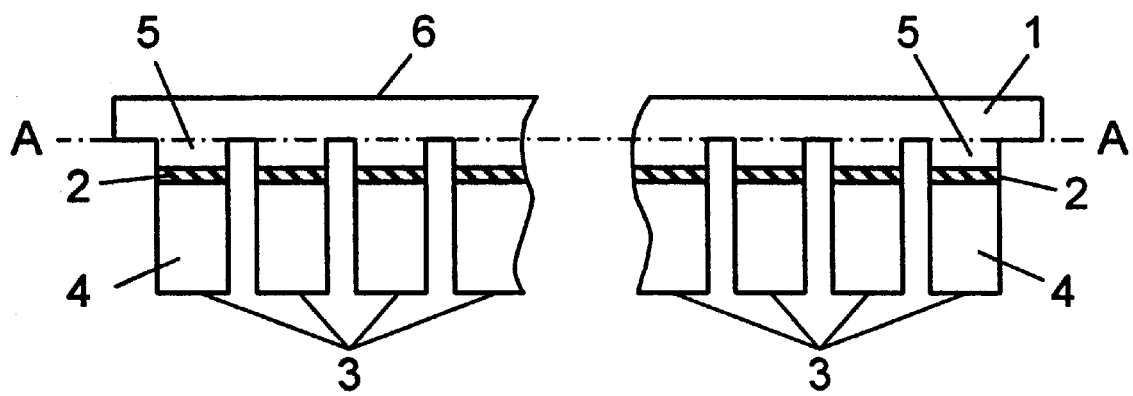
FIG. 1 is a plan view of a comb-like shaped electrode formed by stamping out an aluminum foil, which is used in a first exemplary embodiment of the present invention.

First, a polyimide insulating tape 2 with an adhesive applied onto the surface thereof is adhered to a predetermined position of a 100 micrometers aluminum foil 1 which is a type of valve metal. By stamping out the aluminum foil 1 and polyimide tape 2 together, a comb-like shaped electrode 6 as shown in FIG. 1 is obtained. The above polyimide tape is used to divide each of the protruded sections 3 of the comb-like shaped electrode 6 into a cathode section 4 and an anode section 5.

Figure 2A:
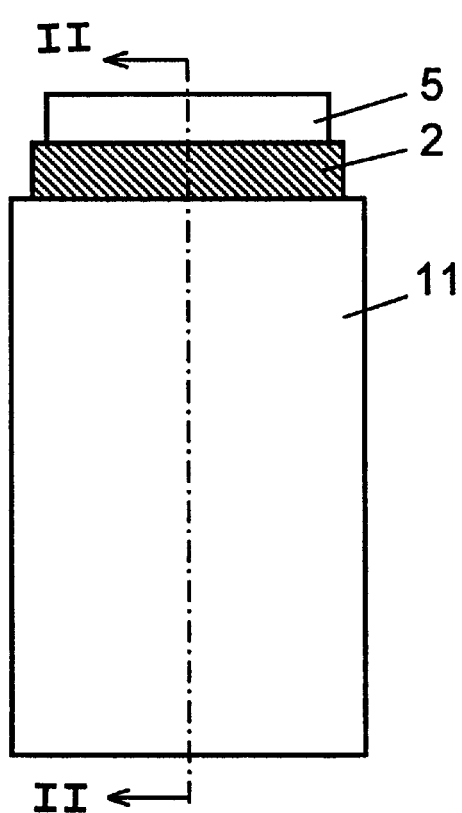
FIG. 2A is a plan view of a capacitor element in the first exemplary embodiment of the present invention.
Figure 2B:
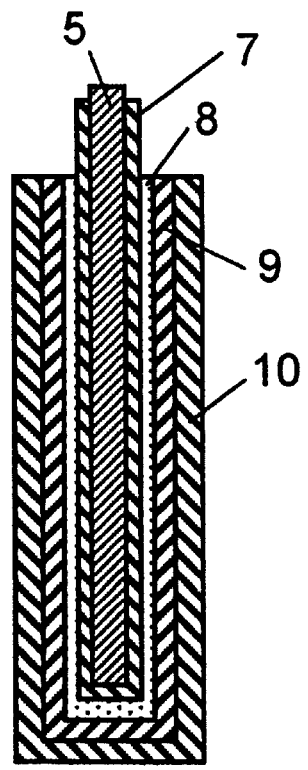
FIG. 2B is a cross-sectional view of the above capacitor element cut along the line II—II of FIG. 2A.

Then, a conducting polymer film 8 comprising polypyrrole is formed on the comb-like shaped electrode 6. The polymerization of the polypyrrole film is performed in an aqueous solution that has dissolved pyrrole and tri-isopropyl naphthalene sulfonic acid. Further, a conductive layer comprising a graphite layer 9 and a silver conductive paint 10 is disposed on the above polypyrrole film by the conventional method. Then, the protruded sections 3 are cut off from the comb-like shaped electrode 6 along the line A—A of FIG. 1, thereby producing a capacitor element 11 as shown in FIG. 2. The reference numeral 7 in FIG. 2. shows a dielectric film formed on the aluminum foil anode 5.

Figure 3:
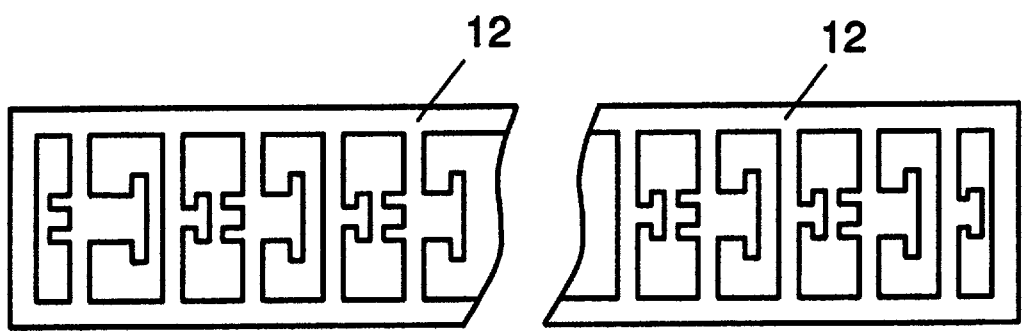
FIG. 3 is a plan view of a lead frame used in the first exemplary embodiment of the present invention.

On the other hand, a lead frame 12 as shown in FIG. 3 is prepared by stamping out a 0.1 mm thick iron sheet (SPCC). After forming a copper layer 24 of the lead frame 12 by plating, the copper layer 24 surface is made rough by sand blasting.

Figure 4A:
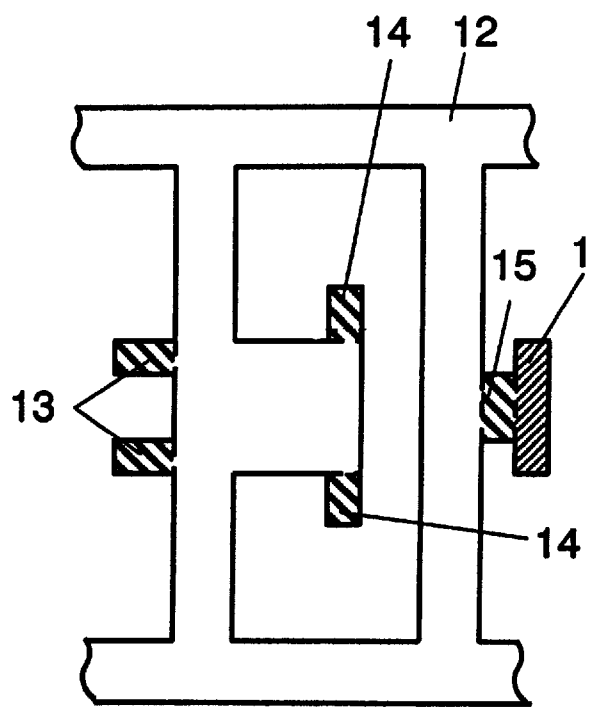
FIG. 4A is a partially enlarged view of FIG. 3.
Figure 4B:
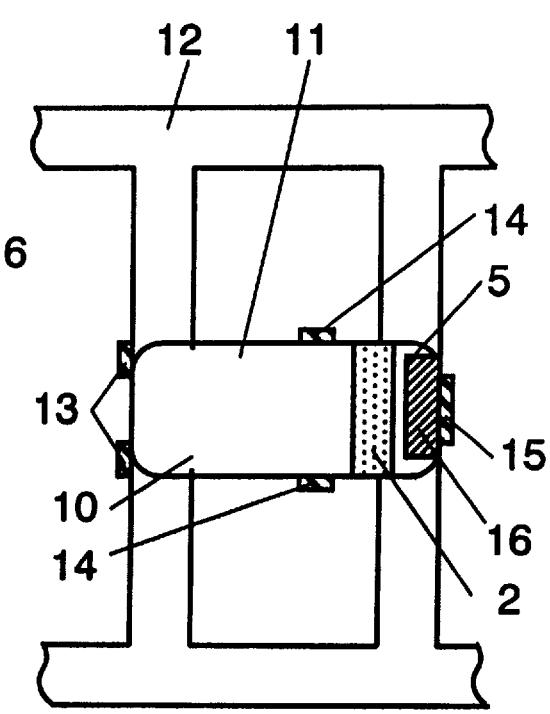
FIG. 4B is a partially enlarged view of FIG. 3, where a capacitor element is disposed on the lead frame.
Figure 5:
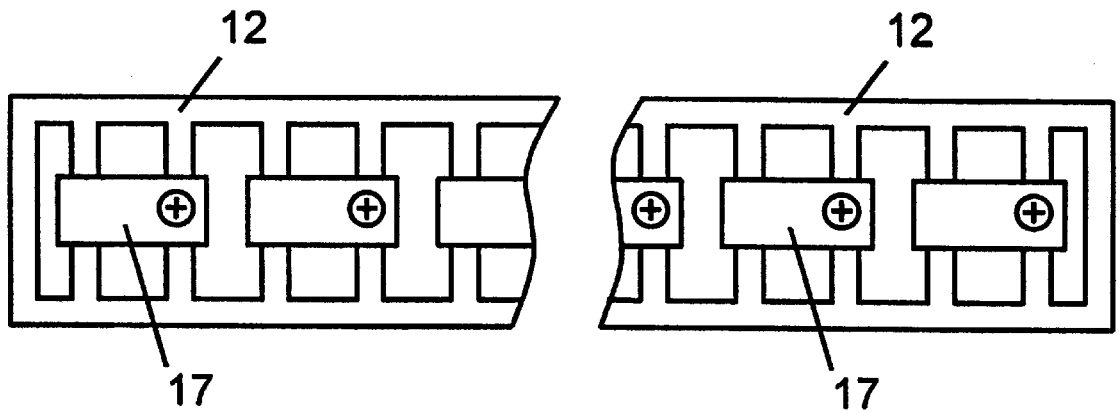
FIG. 5 is a plan view of the capacitor element and lead frame in the first exemplary embodiment of the present invention after molded by protective resin.

Thereafter, a shown in FIG. 4A, a conductive paint is applied onto capacitor element mounting pads 13, 14 and 15 of the lead frame 12. Then, the capacitor element is disposed on the capacitor element mounting pads 13, 14 and 15 and they are bent at a right angle, thereby fixing the capacitor element 11 on the lead frame 12. At this time, a shown in FIG. 4B, the capacitor element mounting pads 13 and 14 fix the cathode part of the capacitor element 11, and at the same time, they electrically connect the cathode, and in the same way the capacitor element mounting pad 15 fixes and electrically connects the anode of the capacitor element 11. Furthermore, a holding section 16 as shown in FIG. 4A is further bent at a right angle as shown in FIG. 4B and then connected to the anode 5 of the capacitor element 11 by laser welding, thus completing an electrical connection.

According to the foregoing processing, the lead frame 12 connected with a plurality of capacitor elements 11 is completed. This lead frame 12 with the plurality of capacitor elements 11 is sent to a resin molding step (not shown in the drawings) and molded with an encapsulation resin such as epoxy resin and the like, thereby finishing the encapsulation of the capacitor elements 11.

The above encapsulated capacitor elements 11 are cut off from the lead frame 12, thus finishing the production of chip solid electrolytic capacitors.

An evaluation for hermetic ability of the chip capacitors produced according to the foregoing process has been conducted (packaging hermetic ability test). The evaluation method is as follows:

First, the chip solid electrolytic capacitors to be tested are kept 5 minutes in a high temperature chamber at 250 degrees C. (±5° C.) and then taken out from the high temperature chamber and left at room temperature. This heat shock cycle is repeated three times and then the test sample capacitors are kept for 30 minutes in an atmosphere containing radioactive Kr 85 and pressurized to 7 Kg/cm$^2$. When a chip solid electrolytic capacitor subjected to the above test becomes hermetically defective after the test, the Kr 85 infiltrates into the gaps between the sealing resin and the lead frame. Therefore, when the test sample capacitors are placed on a dry photographic plate and the dry photographic plate is developed, the defective sample capacitors, which have the Kr 85 infiltrated into the inside of the sealing resin, can be detected.

The above evaluation test has been conducted with sample capacitors as they were immediately after production, and also with sample capacitors that were kept for 16 hours in an atmosphere of 85° C. and 85% RH after production. Six different kinds of epoxy resin that differ in thermal expansion coefficient from one another, as shown in Table 1, are used in the sample capacitors and chip solid electrolytic capacitor test pieces are produced by the same production process. In Table 1, epoxy resins (1) and (6) belong to a dicyclopentadiene derivative epoxy resins and from (2) to (5) belong to an o-cresol novolac derivatives. The packaging hermetic ability tests have been conducted with 30 pieces of each respective epoxy resin for both just after encapsulation and after moisture absorption, and the number of sample capacitors found defective have been counted.

The result of hermetic ability test is shown in Table 1.

TABLE 1

| Kinds of epoxy resins | | 1 | 2 | 3 | 4 | 5 | 6 |
|---|---|---|---|---|---|---|---|
| Coefficient of thermal expansion (*) | | 1.2 | 1.6 | 1.3 | 1.5 | 2 | 1.6 |
| Bending modulus (GPa) | | 21.6 | 13.2 | 15.7 | 12 | 13 | 18 |
| Stress factor (**) | | 25.9 | 21.1 | 20.4 | 18 | 26 | 28.8 |
| Water absorption (%) | | 0.2 | 0.34 | 0.3 | 0.33 | 0.3 | 0.23 |
| Melt viscosity (Poise at 175° C.) | | 25 | 25 | 32 | | | |
| failure | No Moisture | 0 | 2 | 1 | 0 | 1 | 0 |
| | With Moisture | 0 | 0 | 6 | 7 | 1 | 1 |

(*): $10^{-5}$/–C.
(**): Coefficient of thermal expansion × Bending modulus

It is apparent from Table 1 that the use of a lead frame formed of an iron substrate with copper plating applied to the substrate surface and a resin (1) with a thermal expansion coefficient close to that (1.17) of the above lead frame is effective in protecting the chip solid electrolytic capacitors.

Second Exemplary Embodiment

After a copper layer has been formed on the surface of a 0.1 mm thick iron sheet (SPCC) that constitutes a lead frame, the surface of the copper layer is made rough by sand blasting.

Figure 6:
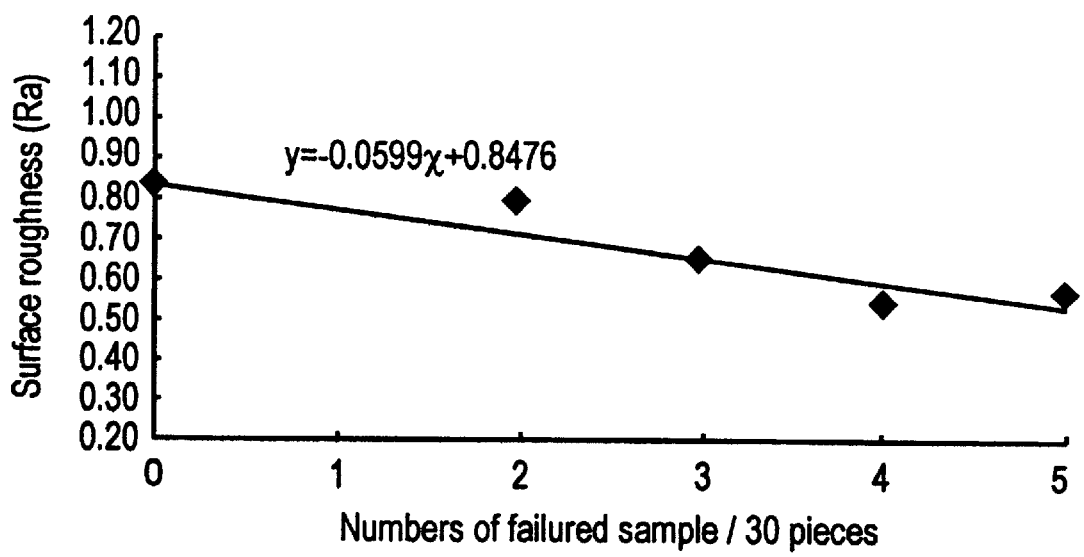
FIG. 6 is a graph showing the relationships between the surface roughness of the lead frame used in the second exemplary embodiment and the hermetic defects.

A resin hermetic ability test evaluation of the solid electrolytic capacitors produced by the use of five kinds of lead frame that differ from one another in the order of extent of surface roughness was conducted in the same way as in the first exemplary embodiment. The results of the evaluation is shown in FIG. 6. It is apparent from FIG. 6 that if the surface roughness of the copper layer plated on the lead frame of the solid electrolytic capacitor in this exemplary embodiment is 0.9 micrometers or more in Ra value, excellent resin hermetic ability can be obtained. Here, Ra is defined as a "Center Line Average Surface Roughness" in Japan Industrial Standard B.0601-1982.

Third Exemplary Embodiment

Figure 7:
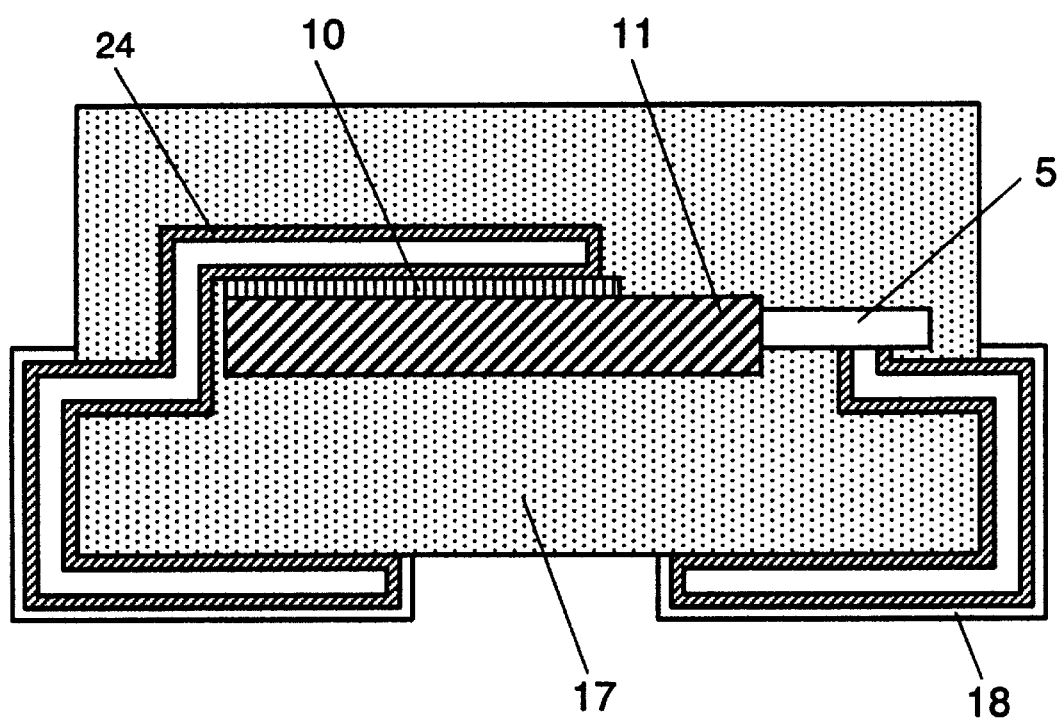
FIG. 7 is a cross-sectional view of the capacitor element in the third exemplary embodiment of the present invention.
Figure 8A:
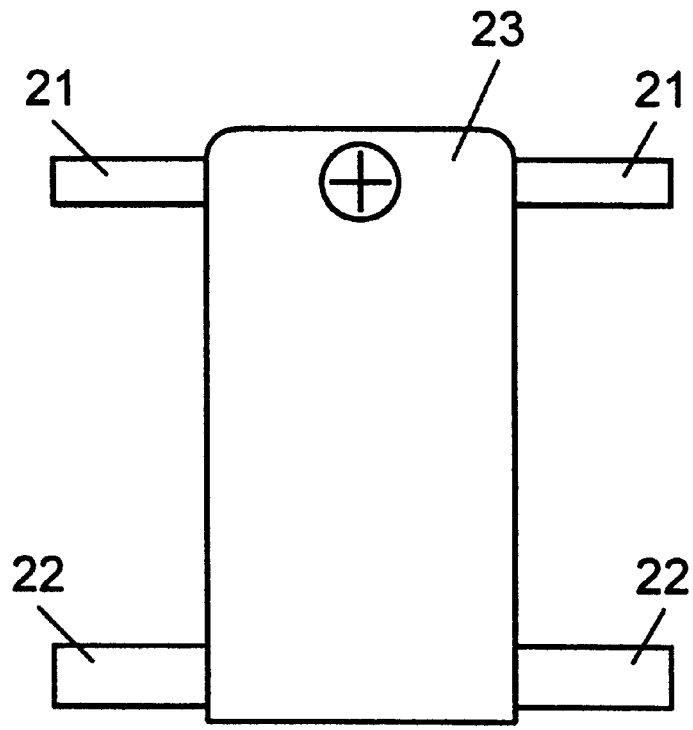
FIG. 8A is a plan view of a prior art solid electrolytic capacitor.
Figure 8B:
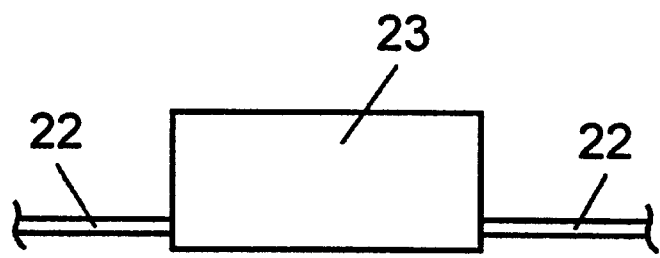
FIG. 8B is a side view of the prior art solid electrolytic capacitor.

In the second exemplary embodiment, after resin molding of solid electrolytic capacitors, a protective plating layer 18 is formed on each respective terminal section that is exposed by extending from a packaging epoxy resin 17 as shown in FIG. 7. As the protective plating material gold, silver, a tin-lead alloy and tin are used.

The result of impedance characteristics measurement conducted with the solid electrolytic capacitors in the present exemplary embodiment is shown in Table 2.

TABLE 2

| | Frequency (KHz) | | | | |
|---|---|---|---|---|---|
| Protective Plating Materials | 100 | 200 | 300 | 400 | 500 |
| Gold | 39 | 21.1 | 15.5 | 12.8 | 10.8 |
| Silver | 41 | 22.8 | 17.8 | 12.8 | 10.8 |
| Tin-Lead Alloy | 44.3 | 24.9 | 19.9 | 16.7 | 14.3 |
| Tin | 45.8 | 25.4 | 22.1 | 17.2 | 14.8 |

It is apparent from Table 2 that, by applying gold plating to the terminal, solid electrolytic capacitors of excellent impedance characteristics can be obtained.

The solid electrolytic capacitor constructed according to the present invention does not have any gaps formed between the lead frame and the molding resin, and therefore, even when protective plating is applied to the terminal after resin molding, a plating solution does not infiltrate into the inside of the solid electrolytic capacitor. Since the solid electrolytic capacitor in the present exemplary embodiment has it terminals applied with protective plating, the solderability of the solid electrolytic capacitor in the present exemplary embodiment does not deteriorate even if the solid electrolytic capacitor has been stored for a long period. In the present exemplary embodiment, the terminal protecting plating can be applied to a series of the lead frame continuously, or the terminals can be plated by a barrel plating method or the like after individual solid electrolytic capacitors are made. Tin, tin alloys or other precious metals can be used as the material for the protective plating layer.

According to the present exemplary embodiment, solid electrolytic capacitors that have a long storage life and also have good reliability after mounting on a circuit board can be obtained.

Fourth Exemplary Embodiment

In the first exemplary embodiment, a protective treatment is applied to the copper plating layer by immersing the lead frame 12 in an aqueous solution of triazine thiol after having the surface of the copper layer made rough. A solid electrolytic capacitor produced according to the present exemplary embodiment shows excellent reliability in the hermetic ability test in the same way as in the first exemplary embodiment. The solid electrolytic capacitor produced according to the present exemplary embodiment has shown excellent solderability even after being stored for a long period of time in air.

Furthermore, instead of forming a protective plating layer on a lead frame in the third exemplary embodiment, a finished solid electrolytic capacitor has been immersed in an aqueous solution of benzotriazole to protect the copper plated coating.

In this case, too, the solid electrolytic capacitor produced according to the present exemplary embodiment has shown excellent solderability even after being stored for a long period of time in air.

As described above, the solid electrolytic capacitor prepared according to the present invention has a layer of copper metal formed on the surface of a lead frame that serves as terminals. It also has the surface of the copper plated layer made rough. And, also, the thermal expansion coefficient of the molding resin is made as close as possible to that of the lead frame. As a result, the solid electrolytic capacitor produced according to the present invention shows excellent solderability and can withstand a heat shock at the time of soldering when the solid electrolytic capacitor is mounted on a circuit board. A solid electrolytic capacitor of the present invention shows excellent reliability even after mounted on a circuit board. In addition, by applying a protective plating onto the terminals after resin molding, a solid electrolytic capacitor with an excellent long shelf life and excellent reliability after mounting on a circuit board is available. Also, by applying onto the copper plated layer a protective treatment using an organic protective material typified by a chemical compound of triazine derivatives, a solid electrolytic capacitor exhibiting an excellent long shelf life and excellent reliability after mounting on a circuit board is available.

What is claimed is:

1. A solid electrolytic capacitor comprising:

a solid electrolytic capacitor element, comprising a valve metal, an oxide layer on the valve metal, a conductive high polymer layer and a conductor layer on the high polymer layer;

lead frames electrically connected to said valve metal and said conductor layer of said capacitor element; and a protective resin which encapsulates said capacitor element and a part of said lead frames, wherein at least the surface of said lead frames that come into contact with said protective resin has a copper layer having a surface roughness of 0.9 micrometers or more in Ra value as defined in the Japanese Industrial Standard, and said protective resin has a thermal expansion coefficient close to the thermal expansion coefficient of said lead frames.

2. The solid electrolytic capacitor according to claim 1, wherein said lead frames are formed with a protective plating after the application of said protective resin.

3. The solid electrolytic capacitor according to claim 2, wherein said protective plating is gold.

4. The solid electrolytic capacitor according to claim 1, wherein said lead frames are treated with an organic protective material.

* * * * *